(12) United States Patent
Cannon

(10) Patent No.: US 8,176,917 B2
(45) Date of Patent: *May 15, 2012

(54) OXYGEN CONSERVATION SYSTEM FOR COMMERCIAL AIRCRAFT

(75) Inventor: James C. Cannon, Overland Park, CA (US)

(73) Assignee: BE Aerospace, Inc., Wellington, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/868,690

(22) Filed: Aug. 25, 2010

(65) Prior Publication Data

US 2010/0319698 A1 Dec. 23, 2010

Related U.S. Application Data

(60) Division of application No. 11/853,493, filed on Sep. 11, 2007, now Pat. No. 7,784,463, which is a continuation of application No. 11/008,634, filed on Dec. 8, 2004, now Pat. No. 7,588,032.

(51) Int. Cl.
*A61M 11/00* (2006.01)

(52) U.S. Cl. ......... 128/205.14; 128/205.11; 128/204.18; 128/203.25; 128/204.21; 128/204.26; 128/205.17; 244/118.5

(58) Field of Classification Search ............. 128/200.24, 128/202.1, 202.22, 203.22, 203.25, 204.18, 128/204.21–204.23, 204.26, 205.11, 203.13, 128/205.14, 205.17, 205.25; 244/118.5
See application file for complete search history.

(56) References Cited

U.S. PATENT DOCUMENTS

| | | | |
|---|---|---|---|
| 3,467,093 | A | 9/1969 | Hotz et al. |
| 4,098,271 | A | 7/1978 | Maddock |
| 4,344,144 | A | 8/1982 | Damico et al. |
| 4,622,963 | A | 11/1986 | Ansite |
| 4,706,664 | A | 11/1987 | Snook et al. |
| 4,793,342 | A | 12/1988 | Haber et al. |
| 4,827,964 | A | 5/1989 | Guido et al. |
| 4,909,247 | A | 3/1990 | Perrisse et al. |
| 5,007,421 | A | 4/1991 | Stewart |
| 5,165,625 | A | 11/1992 | Gutman |
| 5,265,597 | A | 11/1993 | Wallis |
| 5,809,999 | A | 9/1998 | Lang |
| 6,675,800 | B2 | 1/2004 | Keller |
| 2004/0084048 | A1 | 5/2004 | Stenzler et al. |

*Primary Examiner* — Steven Douglas
(74) *Attorney, Agent, or Firm* — Fulwider Patton LLP

(57) ABSTRACT

An emergency oxygen supply system for use on aircraft in the event of a loss in cabin pressure is configured for delivering allotments of oxygen and timing the delivery such allotments to each passenger so as maximize the efficiency of the transfer of such oxygen into the passenger's bloodstream. The delivery of each allotment is selected so that the entire allotment is available for inhalation into the region of the lung most efficient at oxygen transfer while the volume of the allotment is selected to substantially coincide with the volume of such region of the lung.

10 Claims, 2 Drawing Sheets

OXYGEN CONSERVATION SYSTEM FOR COMMERCIAL AIRCRAFT

RELATED APPLICATIONS

This is a divisional of U.S. Ser. No. 11/853,493, filed on Sep. 11, 2007, U.S. Pat. No. 7,784,463, issued on Aug. 31, 2010, which is a continuation of U.S. Ser. No. 11/008,634 filed Dec. 8, 2004, U.S. Pat. No. 7,588,032, issued on Sep. 15, 2009.

FIELD OF THE INVENTION

The present invention generally relates to emergency oxygen supply systems such as are routinely carried on commercial aircraft for deployment upon loss of cabin pressure. More particularly, the invention pertains to enhancing the efficiency with which the supplied oxygen is used to thereby reduce the total amount of oxygen that needs to be carried on an aircraft.

BACKGROUND OF THE INVENTION

Emergency oxygen supply systems are commonly installed on aircraft for the purpose of supplying oxygen to passengers upon loss of cabin pressure at altitudes above about 12,000 feet. Such systems typically include a face mask adapted to fit over the mouth and nose which is released from an overhead storage compartment when needed. Supplemental oxygen delivered by the mask increases the level of blood oxygen saturation in the mask user beyond what would be experienced if ambient air were breathed at the prevailing cabin pressure altitude condition. The flow of oxygen provided thereby is calculated to be sufficient to sustain all passengers until cabin pressure is reestablished or until a lower, safer altitude can be reached.

Each such face mask has a reservoir bag attached thereto into which a constant flow of oxygen is directed upon deployment of the system and upon activation of the individual face mask via a pull cord. The oxygen is supplied continuously at a rate that is calculated to accommodate a worst case scenario, namely to satisfy the need of a passenger with a significantly larger than average tidal volume who is breathing at a faster than average respiration rate when cabin pressure is lost at maximum cruising altitude. A total of three valves that are associated with the mask serve to coordinate flows between the bag and the mask, and between the mask and the surroundings. An inhalation valve serves to confine the oxygen flowing into the bag to the bag while the passenger is exhaling as well as during the post-expiratory pause and at all times also prevents any flow from the mask into the bag. When the passenger inhales, the inhalation valve opens to allow for the inhalation of the oxygen that has accumulated in the bag. Upon depletion of the accumulated oxygen, the dilution valve opens to allow cabin air to be drawn into the mask. The continuing flow of oxygen into the bag and through the open inhalation valve into the mask is thereby diluted by the cabin air that is inhaled during the balance of the inhalation phase. During exhalation, the exhalation valve opens to allow a free flow from the mask into the surroundings while the inhalation valve closes to prevent flow from the mask back into the bag. All three valves remain closed during the post-expiratory pause while oxygen continues to flow into the reservoir bag.

Inefficiencies in an emergency oxygen supply system can require the oxygen storage or oxygen generation means to be larger and therefore weigh more than necessary which of course has an adverse impact on the payload capacity and fuel consumption of the aircraft. Enhancing the efficiency of such a system either in terms of the generation, storage, distribution or consumption of oxygen could therefore yield a weight savings. Conversely, an enhancement of a system's efficiency without a commensurate downsizing would impart a larger margin of safety in the system's operation. It is therefore highly desirable to enhance the efficiency of an emergency oxygen supply system in any way possible.

SUMMARY OF THE INVENTION

The present invention overcomes shortcomings inherent in emergency oxygen supply systems that are currently in use on commercial aircraft to substantially reduce the amount of oxygen that is needed in the event of a loss in cabin pressure. The need to carry or generate less oxygen on board allows a significant weight savings to be realized. Alternatively, foregoing a reduction in the size of the oxygen supply allows the system to operate with an enhanced margin of safety.

The reduction in the rate of oxygen consumption is achieved by adjusting the allotment of oxygen to each individual passenger as function of such passenger's actual demand therefor and by in effect inducing the passenger to more efficiently use such allotment. More particularly, allotment is adjusted as a function of each passenger's respiration rate wherein faster breathing results in a faster delivery rate of the passenger's oxygen allotments. More efficient use of the delivered oxygen is induced by timing the delivery of oxygen so that it is inhaled into the most absorption efficient region of the lung and by limiting the volume of the delivered oxygen so as to approximately coincide with the volume of that region of the lung. Cabin air is relied upon to fulfill the balance of the passenger's respiratory volume.

The present invention takes advantage of the fact that while some regions of the lung are more effective at transferring oxygen to the blood than others, the region of the lung with the highest efficacy is first to be filled during the inhalation phase. Such region comprises the lower lobes of the lungs and accounts for approximately one third of the volume inhaled during a typical breath. The upper lobes of the lung are next to fill during the inhalation phase, account for another one third of the volume inhaled during a typical breath and are only moderately effective at transferring oxygen to the blood. The final one third of the volume inhaled during a typical breath comprises the trachea and bronchi which have essentially no oxygen transfer capability. By ensuring that a volume of supplemental oxygen that is inhaled is delivered to the respiratory tract immediately upon start of the inhalation phase, maximum efficiency can be achieved. Delivering said supplemental oxygen in the most efficient manner serves to minimize the volume that must be delivered.

The minimum needed volume of supplemental oxygen can be determined empirically for a given dispensing device and cabin pressure altitude by the following general means:

A human subject is placed in an altitude chamber and the subject is fitted with a pulse oximeter or other suitable instrumentation to measure the level of blood oxygen saturation. Oxygen is delivered initially via the selected dispensing device at a rate known to be safe without taking into consideration the benefit that results from dispensing the oxygen at the most effective point in the breathing cycle. The dispensing rate is then gradually adjusted downward while observing the effect of changed oxygen dosage on the subject's blood oxygen saturation. When the blood oxygen saturation reaches the minimum value considered safe under the test conditions, this is considered the minimum dosage for said conditions of pressure altitude and dispensing device configuration. This experiment is repeated at various altitudes using various test subjects until sufficient data is accumulated to show the necessary minimum dosage as a function of altitude for the population from which the test subjects are drawn.

The minimum blood oxygen saturation level considered acceptably safe is a matter of scientific judgment, depending on such factors as the degree of safety sought and the characteristics of the population to be afforded protection. Under a standard that has been applied previously in certifying passenger oxygen equipment for civil aviation applications, a blood oxygen saturation equal to that achieved when the test subject is breathing ambient air at a pressure altitude of 10,000 ft to 14,000 ft would be considered safe for a limited duration exposure of the sort that would be encountered during an emergency following a loss of cabin pressurization.

In order for an allotment of oxygen to be available for inspiration in every breathing cycle, a preselected event during the respiratory cycle is relied upon to trigger the delivery of oxygen. The most preferred such event is the beginning of the exhalation phase as it is easily detected and gives the system the maximum amount of time to transmit the allotment of oxygen to the passenger. Because the volume of each oxygen allotment is the same for each passenger, a passenger's respiratory rate should be expected to rise in the event the allotment initially fails to satisfy a particular passenger's oxygen requirement. Conversely, a passenger's respiratory rate would be expected to decrease should the oxygen allotment exceed such passenger's oxygen requirement. If desired, deployment of the oxygen masks could be used as a trigger to deliver the initial charge of oxygen to the reservoir, in preparation for the user's first inhalation.

In a preferred embodiment of the present invention, the emergency oxygen supply system employs a slightly modified version of the oronasal face mask and reservoir bag combination that is currently used to the extent that a pressure sensor is fitted to each face mask. The pressure sensor is configured to detect a pressure increase within the mask such as occurs upon exhalation. Additionally, an inlet valve is fitted to the oxygen supply line for each reservoir to control the flow of oxygen thereinto. The ability to adapt a substantially conventional face mask for use with the system of the present invention is especially advantageous as the user interface, with which the passengers are familiar to the extent that the mask is demonstrated before every flight, remains unchanged.

In an alternative embodiment, the pressure sensor can be located at a distance from the mask and a tube or duct that communicates between the mask and the sensor can be provided. The presence of exhalation pressure in the mask would produce a corresponding increase in pressure in the duct that would be transferred to and sensed by the remotely located pressure sensor. This embodiment would permit the sensor to be mounted in a fixed location near the oxygen source, reducing the weight of the mask that interfaces with the user's face, and protecting the sensor from mechanical shocks that the mask could experience.

A calculating device such as a microprocessor, which serves as a controller, receives input from each of the mask pressure sensors as well as additional input such as from sensors that measure the ambient pressure within the cabin to determine the timing of the opening and closing of each inlet valve. In the preferred embodiment, each inlet valve will open when the beginning of an exhalation is detected in the associated mask. The valve will be closed a short time thereafter, wherein the timing thereof is a function of the detected ambient pressure so that altitude can be compensated for. An allotment of oxygen will be delivered to each passenger's reservoir bag during such passenger's exhalation phase while the size of the allotment will be adjusted as a function of altitude—the higher the altitude, the larger the allotment.

In another preferred embodiment, the pressure sensor associated with each mask is relied up to provide the information necessary to estimate the passenger's tidal volume. This estimate can be made by considering the magnitude of exhalation pressure, which would be indicative of the relative rate of flow through the exhalation valve, and the duration during which exhalation pressure is present. By adjusting the timing of the closing of the inlet valve so as to permit a volume of oxygen to enter the reservoir bag that substantially coincides with the desired fraction of the passenger's tidal volume even greater efficiencies can be achieved as both the timing and volume of a passenger's oxygen demand can thereby be closely matched.

In an alternative embodiment, the triggering event for delivery of oxygen to the mask could be the onset of inhalation. In that case, the rate of oxygen delivery to the mask would preferably exceed the initial inhalation rate, to ensure the desired volume of oxygen is dispensed to the reservoir bag soon enough to be available for inhalation during the preferred initial portion of the inhalation cycle.

In an alternative embodiment, the controller can track the time between trigger signals from a given mask. In the event the time elapsed since a triggering event exceeds a predetermined threshold value, the input valve could be signaled to open, delivering an increment of oxygen. Although this increment would not arrive at the optimum time in the breathing cycle, this feature would provide some level of protection against the possibility that the pressure sensor failed to detect the triggering event.

In a preferred embodiment, the oxygen supply is carried in pressurized cylinders rather than generated when needed. This obviates the need for an ignition system, does not involve the generation of heat nor residue, while the downstream pressure is easily regulated and flow is easily modulated. Additionally, a simple pressure gauge allows the readiness of the system to be continually monitored wherein a low cylinder is readily identifiable and easily replaced to restore the system to full operability.

These and other advantages of the present invention will become apparent from the following detailed description of preferred embodiments which, taken in conjunction with the drawings, illustrate by way of example the principles of the invention.

DETAILED DESCRIPTION OF PREFERRED EMBODIMENTS

The Figures illustrate a preferred embodiment of the present invention. The emergency oxygen supply system provides for enhanced efficiencies in the distribution and consumption of the oxygen that is carried aboard an aircraft for use in the event of a loss in cabin pressure. Upon deployment of the system, oxygen is distributed to individual passengers as a function of each individual passenger's respiration rate. The delivery of each allotment of oxygen to each passenger is timed so as to ensure that it is inhaled into that region of the lung that is most efficient at transferring oxygen into the blood while the volume of each allotment is selected to coincide with the approximated volume of such region of the lung.

Figure 1:
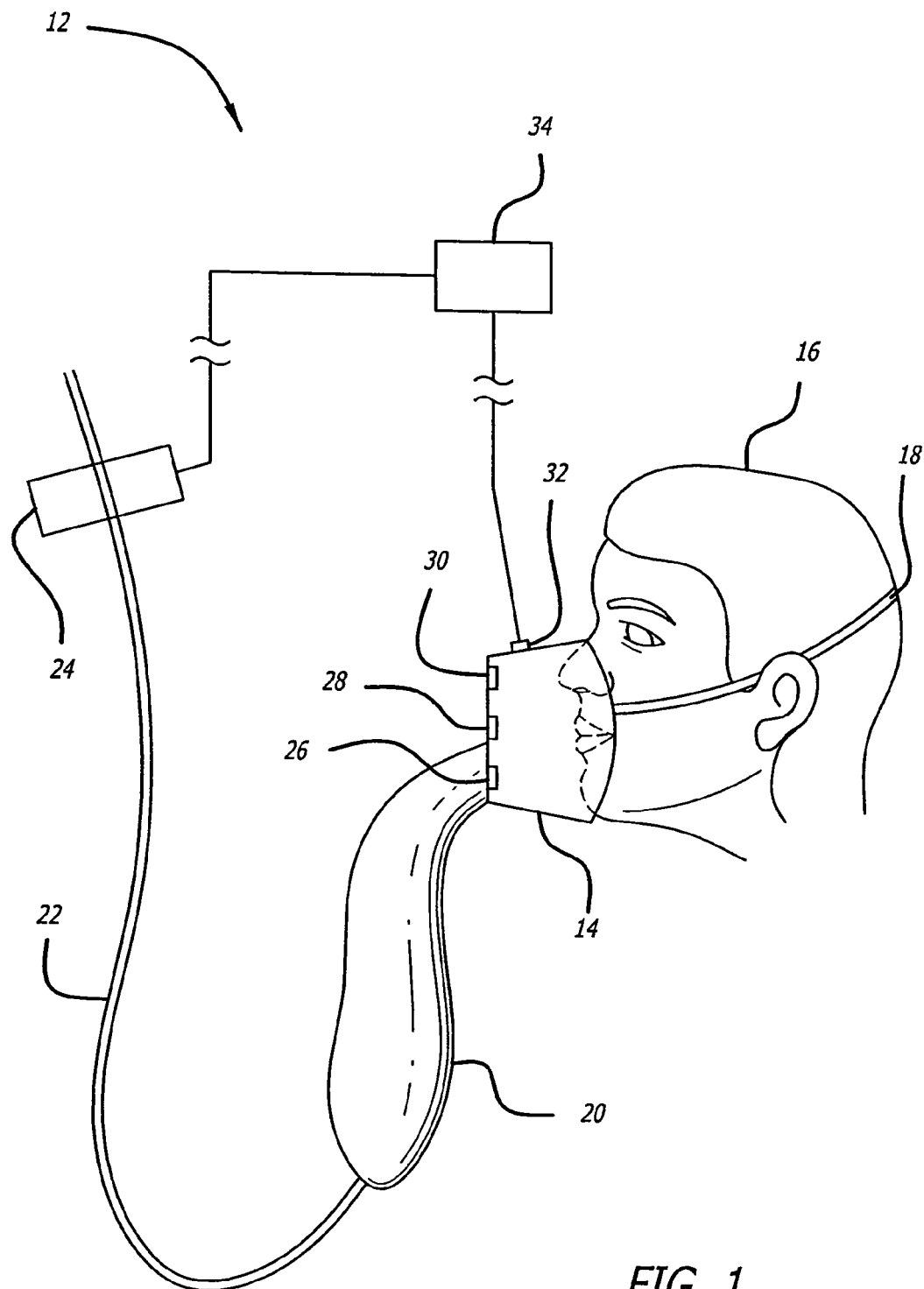
FIG. 1 is schematic illustration of an oxygen mask for use in the emergency oxygen supply system of the present invention.

FIG. 1 is a schematic illustration of the user interface 12 of the present invention. An oronasal mask 14 is configured to fit against a passenger's 16 face and is held in place by an elastic band 18 that extends about the back of the head. An inflatable reservoir bag 20 is attached to the mask and is in fluid communication with a supply conduit 22 through which the flow of oxygen into the bag is controlled by inlet valve 24. The mask includes an inhalation valve 26 that is configured to allow oxygen that has accumulated in the bag to be drawn into the mask during inhalation and to prevent any flow from the mask into the bag. The mask additionally includes a dilution valve 28 that is configured to allow ambient cabin air to be drawn in the mask only after the bag contents has been depleted. The mask also includes an exhalation valve 30 that is configured to allow an exhaled breath to be expelled into the cabin. A pressure sensor 32 fitted to the mask generates a signal when a positive pressure is detected within the mask such as is caused by exhalation. A controller 34 receives input from the pressure sensor and serves to open and close the inlet valve.

Figure 2:
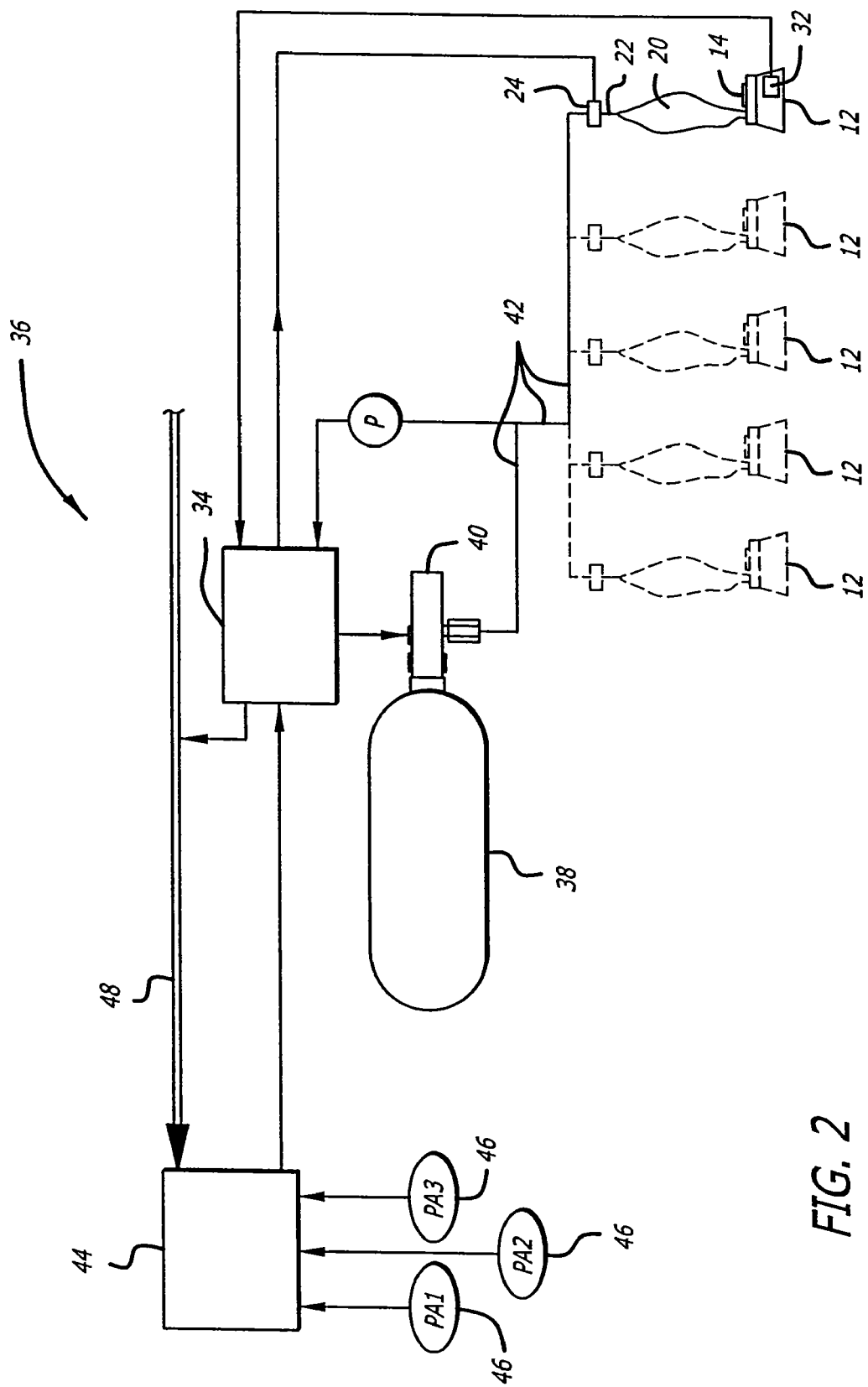
FIG. 2 is a schematic illustration of the emergency oxygen supply system of the present invention.

FIG. 2 is a schematic illustration of the emergency oxygen supply system 36 of the present invention. One or more cylinders 38 of compressed oxygen serve to store the required supply of oxygen. A regulator 40 reduces the pressure of oxygen that is distributed to the individual user interfaces 12 via a network of conduits 42, wherein the flow of oxygen to each individual reservoir bag 20 is controlled by the respective inlet valve 24. A controller 34 receives input from each individual pressure sensor 32, as well as a host computer 44 which in turn receives input from pressure sensors 46 that monitor ambient pressures within the cabin as well as input from the controller and from the flight deck via bus 48.

In use, the readiness of the oxygen supply is easily verifiable by monitoring the internal pressure of cylinder 38. Should a substandard pressure be detected, the oxygen cylinder is either replaced or topped off. When a loss of cabin pressure occurs, all passenger interfaces 12 are released from overhead storage compartments and a pressure regulated supply of oxygen is released into the distribution network 42. Activation of an individual passenger interface is accomplished by selecting a face mask 14 and breathing thereinto. An exhalation is detected by sensor 32 which causes controller 34 to open the inlet valve 24 that is associated with the face mask to allow the influx of oxygen into the associated reservoir bag 20. The controller calculates the volume of oxygen needed in light of the ambient cabin pressure and closes the inlet valve after an appropriate period of time. The system's oxygen pressure is preferably regulated to a level such that the desired volume of oxygen is deliverable to the reservoir bag well within the period of time needed for exhalation. During the passenger's post-expiratory pause, the delivered oxygen is held in the reservoir bag. Upon inhalation, the inhalation valve 26, shown in FIG. 1, allows all of the oxygen within the reservoir bag to be inhaled to fill the passenger's lower lung lobes where the most efficient oxygen transfer takes place. Upon depletion of the contents of the reservoir bag, further inhalation causes the mask's dilution valve to open so as to allow the passenger's respiratory demand to be satisfied by ambient cabin air. Exhalation causes the sequence to repeat.

The configuration of the system causes the frequency with which each reservoir bag is filled to match the frequency of the respiratory rate of the passenger breathing therefrom. Should the volume of oxygen that is received by a particular passenger fail to satisfy that particular passenger's oxygen demand, the respiratory rate would be expected to increase to thereby increasing the frequency with which the allotments of oxygen are delivered to the passenger. Conversely, should the volume of oxygen that is received by a particular passenger during each respiratory cycle exceed such passenger's oxygen requirement, the passenger's respiratory rate would be expected to decrease, thereby decreasing the net flow of oxygen to the passenger.

Within the scope of this invention, the quantity delivered could optionally be increased above the absolute minimum needed, in order to provide a safety margin, if desired.

By timing the delivery of oxygen to each passenger such that the entire oxygen allotment is available for inhalation immediately upon commencement of the inhalation phase, the delivered supplemental oxygen is inhaled into the region of the lung that is most efficient at transferring oxygen to the blood. Because the supplemental oxygen is delivered in the most efficient manner, the quantity of supplemental oxygen needed to achieve a given, desired degree of blood oxygenation is minimized.

Reliance on compressed oxygen rather than chemical oxygen generators allows the net flow of oxygen throughout the distribution network to be matched to the net demand for oxygen without having to accommodate a build up of pressure or heat. The readiness of a compressed oxygen supply, i.e. the cylinder pressure, is also much more easily verified than the readiness of a solid chemical and ignition system. The costly and time consuming need to periodically replace a multitude of oxygen generators is thereby completely obviated.

By substantially matching the delivery of oxygen to a passenger's demand therefor, the efficiency of an emergency oxygen supply system is maximized and oxygen consumption is minimized. Such an increase in efficiency allows the size of the oxygen supply to be reduced when compared with less efficient systems such as are currently in use and thereby allows a substantial weight reduction to be realized. The weight reduction in turn translates into a reduction in an aircraft's fuel consumption and/or an increase in payload capacity.

While particular forms of this invention have been described and illustrated, it will be apparent to those skilled in the art that various modifications can be made without departing from the spirit and scope of the invention. Accordingly, it is not intended that the invention be limited except by the appended claims.

What is claimed:

1. An oxygen supply system for delivering oxygen to passengers in an aircraft in the event of a loss of cabin pressure, comprising:
   a source of oxygen;
   a reservoir bag for receiving a flow of oxygen from said source;
   a face mask configured so as to force a passenger wearing said mask to inhale all oxygen that has accumulated within said reservoir bag prior to inhaling cabin air to satisfy the balance of such passenger's tidal volume; and
   an inlet valve for preventing the flow of oxygen into said reservoir bag during a passenger's inhalation phase.

2. The oxygen supply system of claim 1, wherein said inlet valve is opened during a passenger's exhalation phase.

3. The oxygen supply system of claim 1, wherein said inlet valve is opened for a period of time sufficient to allow a volume of oxygen to accumulate within said reservoir bag that is less than an average passenger's tidal volume.

4. The oxygen supply system of claim 3, wherein said accumulated volume of oxygen coincides to approximately one third of an average passenger's tidal volume.

5. The oxygen supply system of claim 1, further comprising a pressure sensor for detecting a positive pressure within said face mask.

6. The oxygen supply system of claim 5, wherein said inlet valve is opened immediately upon detection of positive pressure within said face mask by said pressure sensor.

7. The oxygen supply system of claim 6, wherein said oxygen is delivered to said reservoir bar prior to completion of said passenger's exhalation phase.

8. The oxygen supply system of claim 1, further comprising a controller responsive to said pressure sensor and operative to open and close said inlet valve.

9. The oxygen supply system of claim 8, wherein said controller delays a closing of said valve as a function of ambient cabin pressure.

10. The oxygen supply system of claim 1, wherein said source of oxygen comprises a container of compressed oxygen gas.

* * * * *